end will have to be longer than at the other. The preferred position is, as above stated, with the forward end of the spring slightly tilted up so that the load spring itself is in better position to cushion the initial shock, and then as the axle moves backward and also upward in mounting the obstacle in the way, the axle rotates as the front of the spring lowers, while the opposite end rises, the load spring being brought into a new position where its action is more vertical, the more easily to allow the axle to rise in surmounting the obstacle.

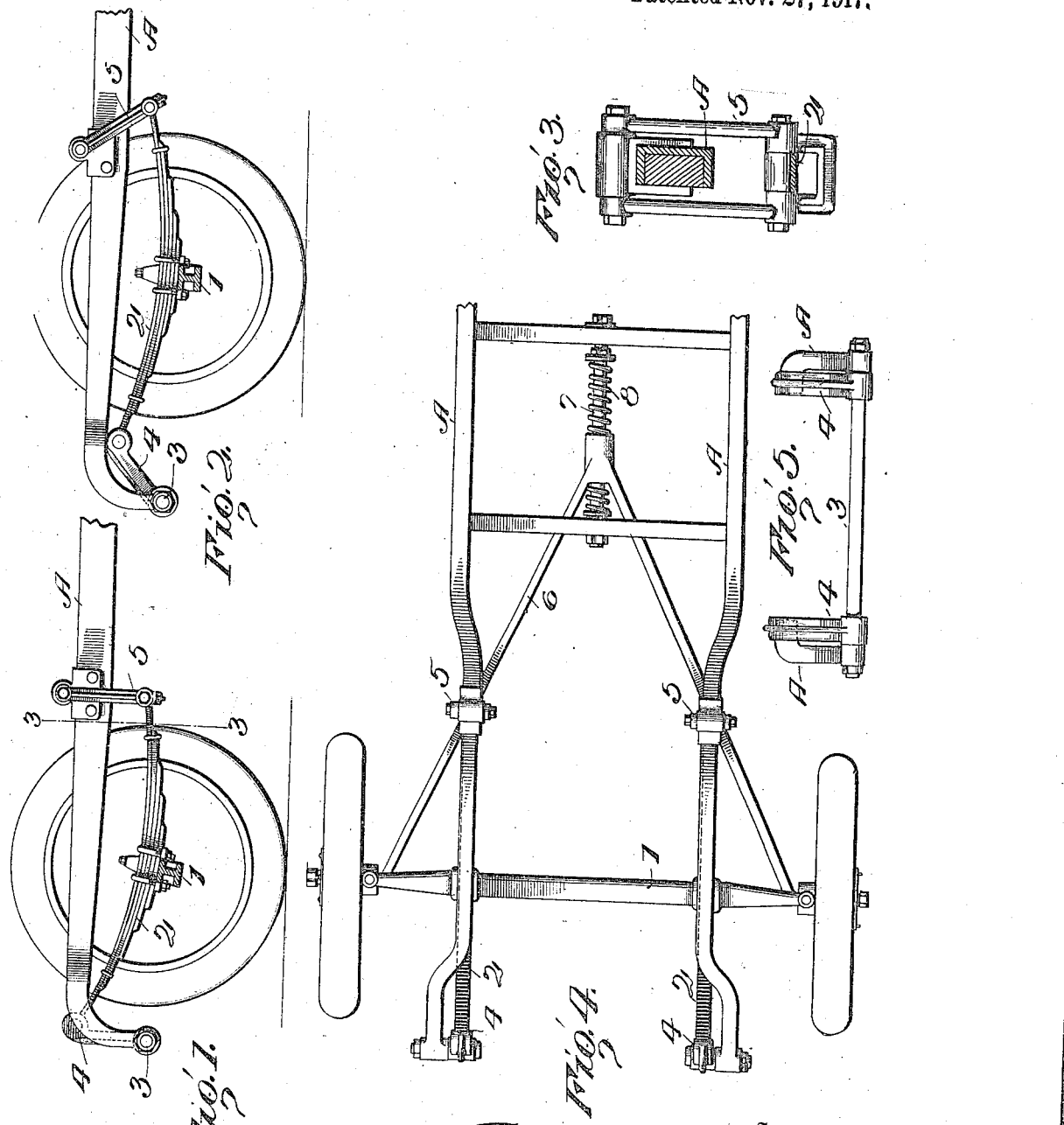

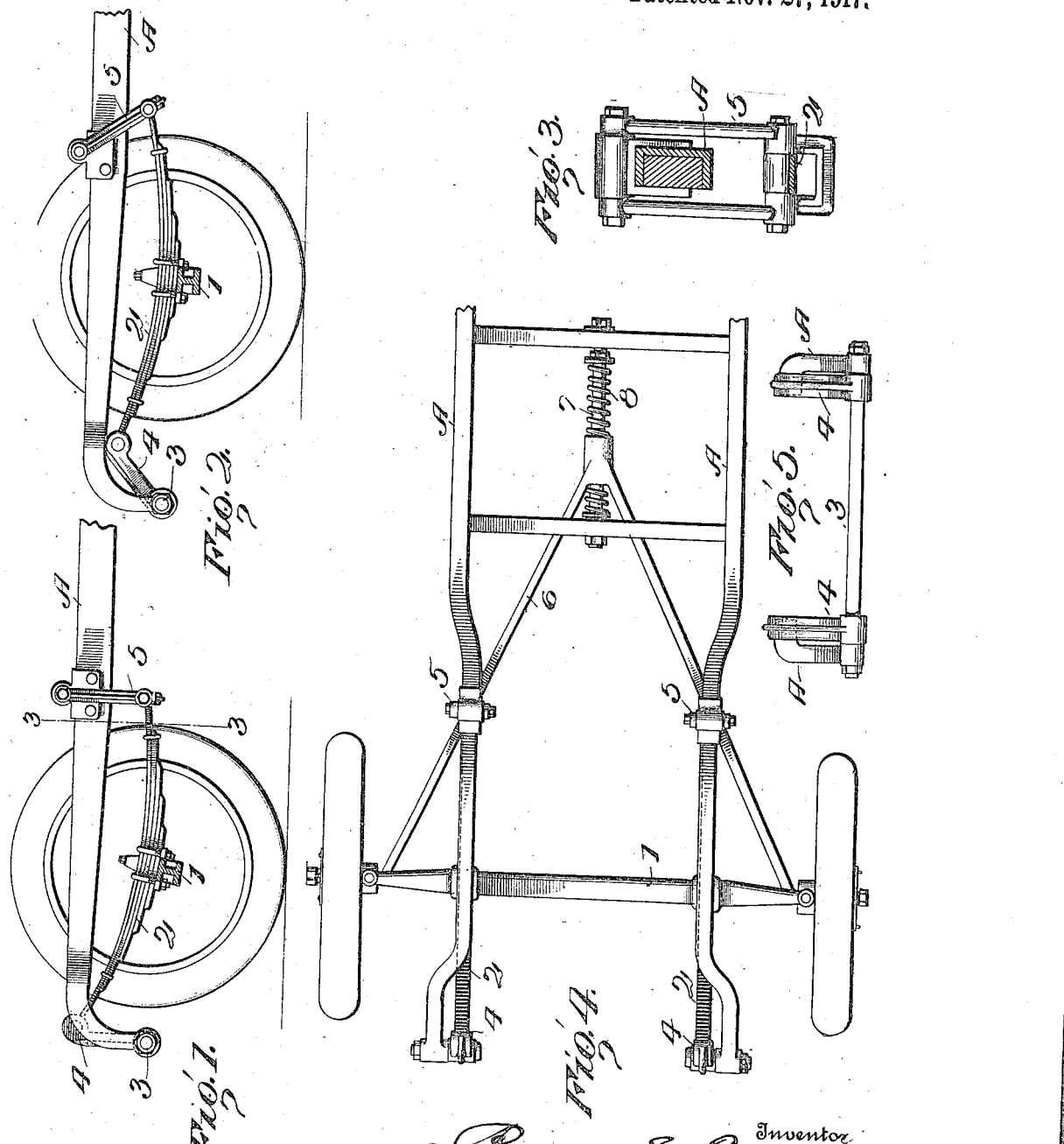

While the cross-shaft 3 is the preferred means of keeping the axle square, this might be done by means of a reach 6 extending inwardly from the axle, as shown in Fig. 4, and having sliding connection with the frame A through the medium of a rod or rods such as 7 for instance, upon which the opposite end of the reach or radius rod is sleeved; or, for example, an armed cross-shaft mounted in the frame and having rods running from the ends of the arms to the axle.

Combined with this balanced link mounting and means to keep the axle square, means may or may not be employed to resiliently oppose the horizontal movement of the axle, and if employed it may consist of any type of shock spring, for instance the spring 8 shown in Fig. 4.

From the foregoing, it will be seen that a maximum horizontal movement of the axle, several inches for instance, with a minimum of vertical movement, is provided for, all of which is accomplished by the balanced link mounting while at all times keeping the axle square with the frame.

The cross-shaft may carry the shackles 5, or the compression links may be used in front and the load spring mounted normally about horizontal so that the backward movement will tilt it up in front, but these details do not change the essential points of the invention, and so I do not confine myself to the exact construction shown.

I claim:

1. The combination with a frame and axle, of load springs mounted on the axle, means including links connecting the springs with the frame to allow axle movement substantially parallel with the frame, and means to maintain the axle at right angles to the line of draft.

2. The combination with a frame and axle, of load springs mounted on the axle, means including links connecting the springs with the frame to allow movement parallel with the frame, means to maintain the axle at right angles to the line of draft, and means to resiliently oppose said parallel movement of the axle.

3. The combination with a frame and axle, of load springs mounted on the axle, means including links connecting the springs with the frame to allow the axle movement parallel with the frame, means attached to the frame to maintain the axle at right angles to the line of draft, and means attached to the frame to resiliently oppose said parallel movement of the axle.

4. The combination with a frame and axle, of load springs mounted on the axle, means connecting the springs with the frame to allow the axle movement parallel to the frame, means to maintain the axle at right angles to the line of draft, and means to resiliently oppose said parallel axle movement.

5. In an axle mounting, the combination of a frame, axle, load springs, means between load springs and frame to allow the axle movement parallel to the frame, means to maintain the axle square with the line of draft, and means to resiliently oppose said parallel axle movement.

6. In an axle mounting, the combination of a frame, axle, load springs, means between load springs and frame to allow the axle movement parallel to the frame, means connected to the frame and to the axle to maintain the axle square with the line of draft, and means connected to the frame to resiliently oppose said parallel axle movement.

7. In an axle mounting, the combination of a frame, an axle, load springs secured to the axle, and tension and compression links located at opposite ends of the load springs and which swing in opposite arcs and provide for connecting the latter to the frame, means to keep the axle in the same relative position with respect to the frame in its horizontal travel.

8. In an axle mounting, the combination of a frame, an axle, load springs secured to the axle, tension and compression links located at opposite ends of the load springs and which swing in opposite arcs and provide for connecting the latter to the frame, means to keep the axle in the same relative position with respect to the frame in its horizontal travel, and means to resiliently oppose the horizontal travel of the axle.

9. The combination with a frame and axle, of load springs mounted on the axle, and means including tension and compression links which are located on opposite sides of their supports for attaching the load springs to the frame so as to give the axle substantially parallel movement with respect to the frame, and means to maintain the axle at right-angles to the line of draft.

10. The combination with a frame and axle, of load springs mounted on the axle, means including tension and compression links which are located on opposite sides of their supports for attaching the load springs to the frame so as to give the axle substan-

UNITED STATES PATENT OFFICE.

ROLLAND S. TROTT, OF DENVER, COLORADO.

AXLE-MOUNTING.

1,247,747.

Specification of Letters Patent.

Patented Nov. 27, 1917.

Application filed March 19, 1915. Serial No. 15,607.

*To all whom it may concern:*

Be it known that I, ROLLAND S. TROTT, a citizen of the United States, residing at the city and county of Denver and State of Colorado, have invented certain new and useful Improvements in Axle-Mountings, of which the following is a specification.

My invention relates to an improved axle mounting.

The primary object is to provide a mounting that will allow more and freer backward movement of the axle, that is to say horizontal movement of the axle without any vertical movement incidental thereto, while at the same time keeping the axle square.

In my present invention, I propose to accomplish these objects by the use of a balanced link mechanism, which while susceptible of variations, a construction well adapted to the purpose, consists in the suspension of the frame upon the load springs secured on the axle, by means of the links as is common practice in the mounting of springs at the present time, but these links are constructed and adapted to accomplish the special object and purpose of this invention.

If the links employed are all tension links, or all compression links, the horizontal movement of the axle swinging all these links in the same direction brings in a vertical movement dependent upon the arc through which the links swing, with the result that the frame of the vehicle is given a vertical movement through the horizontal movement of the axle, and without any vertical movement of the axle. The result is as much discomforture as the uncushioned horizontal shock would make, and the benefit of the horizontal cushioning is largely lost. Consequently the mounting of the load springs on the frame must be of such a nature that no vertical movement is resultant from the horizontal movement. All the vertical movement must come through the action of the load springs, and none from the horizontal movement of the axle. A variety of different connections between the load springs and the frame would accomplish this. But it is proposed in the present invention to mount one end of the load springs from a link in tension, and the other end from a link in compression. Swinging either side of the central position, the tension link gives that end of the spring a downward vertical movement with respect to the frame, and as a by-product of the horizontal action of the axle, while on the other hand the compression link gives the other end of the spring a corresponding upward vertical movement. Thus one end of the load spring rises as the other end lowers, the result being a slight axial rotation of the axle, but no vertical movement thereof with respect to the frame.

In the accompanying drawings:—

Figure 1 is a view from one side, showing the normal position of axle, load springs, and balanced link mounting, with the cross-shaft at the front keeping the axle square;

Fig. 2 is a side view showing the changed relative position after striking an obstruction and the axle has moved backward;

Fig. 3 is an enlarged transverse section on the line 3—3 of Fig. 1:

Fig. 4 is a plan view showing a radius-rod or reach connection with the frame for keeping the axle square;

Fig. 5 is a view showing the cross-shaft with the tension-links.

A, indicates the frame of the machine; 1, is the axle; 2 is the load spring secured at its center in any approved manner to the axle; and 3 is the cross-shaft which extends from one side of the frame to the other, with its opposite ends mounted to rock in the sides of the frame.

Upstanding from the cross-shaft 3 are the tension-links 4, there being one for each load spring, and to the upper end of which the load springs are connected.

Depending from and pivotally mounted on the frame are the compression links 5, their lower ends being pivotally connected with the corresponding ends of the load-springs 2.

With the mounting as shown in Fig. 1, the axle is normally inclined or tilted, due to the higher suspension of the load spring at one end upon the tension link, and also at the opposite end the lower suspension upon the compression link. In this way the links 4 and 5 become in effect balanced links.

Also dependent on the spring dimensions, and whether the axle is right in the middle of its length or not, it will be found that to get the desired results, and allow at the same time for the straightening out or lengthening of the spring under vertical shock, a horizontal component of which produces the horizontal axle movement, the link at one